(12) United States Patent
Mercier et al.

(10) Patent No.: US 10,145,421 B2
(45) Date of Patent: Dec. 4, 2018

(54) COMBUSTION ENGINE, AN AIRCRAFT FITTED WITH SAID ENGINE, AND A METHOD OF FABRICATING SUCH AN ENGINE

(71) Applicant: AIRBUS HELICOPTERS, Marignane (FR)

(72) Inventors: Christian Mercier, La Fare les Oliviers (FR); Pierre-Julien Hubert, Igny (FR); Pierre Gavanier, Croissy sur Seine (FR); Yann Balastrier, Saint-Cloud (FR)

(73) Assignee: AIRBUS HELICOPTERS P.C., Marignane (FR)

( * ) Notice: Subject to any disclaimer, the term of this patent is extended or adjusted under 35 U.S.C. 154(b) by 0 days.

(21) Appl. No.: 15/579,638

(22) PCT Filed: Jul. 21, 2016

(86) PCT No.: PCT/EP2016/067400
§ 371 (c)(1),
(2) Date: Dec. 5, 2017

(87) PCT Pub. No.: WO2017/021165
PCT Pub. Date: Feb. 9, 2017

(65) Prior Publication Data
US 2018/0156281 A1 Jun. 7, 2018

(30) Foreign Application Priority Data
Aug. 6, 2015 (FR) ..................... 15 01682

(51) Int. Cl.
*F16D 1/076* (2006.01)
*F16H 57/025* (2012.01)
(Continued)

(52) U.S. Cl.
CPC .............. *F16D 1/076* (2013.01); *B60K 3/02* (2013.01); *B60K 5/02* (2013.01); *B64C 27/12* (2013.01);
(Continued)

(58) Field of Classification Search
CPC ... F16D 1/076; F16D 1/06; F16D 3/06; F16C 3/12; F16C 3/04; F16H 57/025;
(Continued)

(56) References Cited

U.S. PATENT DOCUMENTS

| | | | |
|---|---|---|---|
| 2,650,484 A | 9/1953 | Bujak | |
| 2,934,919 A | 5/1960 | Barta et al. | |

(Continued)

FOREIGN PATENT DOCUMENTS

| | | | |
|---|---|---|---|
| CH | 656933 A4 | 7/1986 | |
| DE | 3320444 C1 | 10/1987 | |
| FR | 2547551 A1 | 12/1984 | |

OTHER PUBLICATIONS

International Search Report for European Application No. PCT/EP2016/067400, Completed by the European Patent Office, dated Oct. 14, 2016, 10 pages.

*Primary Examiner* — Grant Moubry
(74) *Attorney, Agent, or Firm* — Brooks Kushman P.C.

(57) ABSTRACT

The present invention relates to a combustion engine which includes at least one crankshaft rotating about a first rotation shaft; at least one output shaft outputting an engine torque, said output shaft rotating about a second rotation shaft separate from said first rotation shaft; at least one transmission assembly rotating about said first rotation shaft and being rotated by said crankshaft in order to transmit said engine torque to said output shaft.

14 Claims, 3 Drawing Sheets

(51) Int. Cl.

| | |
|---|---|
| *B60K 3/02* | (2006.01) |
| *B60K 5/02* | (2006.01) |
| *B64C 27/12* | (2006.01) |
| *B64D 27/04* | (2006.01) |
| *F16D 1/06* | (2006.01) |
| *F16D 3/06* | (2006.01) |
| *F16H 57/00* | (2012.01) |
| *B64D 27/26* | (2006.01) |
| *B64D 35/00* | (2006.01) |
| *F02B 61/00* | (2006.01) |
| *F16C 3/12* | (2006.01) |

(52) U.S. Cl.
CPC ............... *B64D 27/04* (2013.01); *F16D 1/06* (2013.01); *F16D 3/06* (2013.01); *F16H 57/0025* (2013.01); *F16H 57/025* (2013.01); *B64D 27/26* (2013.01); *B64D 35/00* (2013.01); *F02B 61/00* (2013.01); *F16C 3/12* (2013.01)

(58) Field of Classification Search
CPC ...... F16H 57/0025; F02B 61/00; F02B 61/04; F02B 61/06; B60K 5/02; B60K 3/02; B64C 27/12; B64D 27/04; B64D 27/26; B64D 35/00
See application file for complete search history.

(56) References Cited

U.S. PATENT DOCUMENTS

| | | | |
|---|---|---|---|
| 3,447,392 A | 6/1969 | Kawchitch | |
| 4,606,671 A | 8/1986 | Rasmussen | |
| 8,235,160 B2* | 8/2012 | Ogasawara | F16H 61/32 180/230 |
| 8,707,814 B2* | 4/2014 | Saitoh | F16H 63/18 180/230 |
| 2008/0154468 A1* | 6/2008 | Berger | B60K 6/365 701/54 |
| 2010/0229816 A1* | 9/2010 | Matsuo | B60K 6/48 123/179.25 |
| 2013/0062135 A1* | 3/2013 | Saitoh | F16H 3/006 180/230 |
| 2013/0139627 A1* | 6/2013 | Saitoh | F16H 63/18 74/331 |
| 2015/0184586 A1* | 7/2015 | Tanaka | F02B 33/40 123/559.1 |

* cited by examiner

COMBUSTION ENGINE, AN AIRCRAFT FITTED WITH SAID ENGINE, AND A METHOD OF FABRICATING SUCH AN ENGINE

CROSS-REFERENCE TO RELATED APPLICATIONS

This application is the U.S. National Phase of PCT application No. PCT/EP2016/067400 filed on Jul. 21, 2016, which claims priority to French patent application No. FR 1501682 filed on Aug. 6, 2015, the disclosure of which is incorporated in its entirety by reference herein.

BACKGROUND OF THE INVENTION

(1) Field of the Invention

The present invention relates to the field of combustion engines including a crankshaft driven in rotation by the reciprocating motion in translation of at least one piston. Such a combustion engine may in particular be a diesel engine or more generally a piston engine.

(2) Description of Related Art

In general manner, on such combustion engines, the engine torque used for driving auxiliary members, or "engine output torque", can be taken directly from the end of the crankshaft. Nevertheless, with self-ignition engines, the engine output torque can vary substantially over time, e.g. in an engine cycle during the rotation of the crankshaft as generated by the movement in translation of the piston. Unfortunately, such variations in engine torque on the crankshaft can be problematic in certain applications.

Thus, engines have also been developed in which the output torque is taken, not directly from the end of the crankshaft, but from an auxiliary output shaft, e.g. a decoupling shaft. Such a decoupling shaft may then present properties of flexibility in twisting, thus making it possible to absorb some or all of the variations in the engine torque at the output from the crankshaft.

In particular, such an output shaft may be arranged on an axis of rotation that is different from the axis of rotation of the crankshaft, and which may for example be parallel to the axis of rotation of the crankshaft. The engine torque can then be transmitted from the crankshaft to the output shaft via a transmission gear train.

Under such circumstances, a transmission assembly formed by an intermediate sleeve and a transmission gear is driven in rotation by female fluting formed at the end of the crankshaft. Unfortunately, variations in torque and micromovements at the output from the crankshaft can give rise to microblocking between the transmission assembly and the crankshaft via the fluting connection.

Such microblocking of the connection can then give rise to an axial movement in a preferred direction and to premature wear of the fluting connection, e.g. by forming a sloping ramp on each fluting groove, having the effect of exerting an axial thrust force on the transmission assembly. In the long run, this axial force can move the transmission assembly and cause it to rub against other stationary or moving portions of the engine such as the engine casing, guide bearings, or other adjacent gears, damaging them irreversibly.

Documents FR 2 547 551, U.S. Pat. No. 2,934,919, U.S. Pat. No. 2,650,484, DE 33 20 444, U.S. Pat. No. 3,447,392, and CH 656 933 thus describe various combustion engines or mechanical assemblies in the prior art, but without thereby anticipating the subject matter of the invention.

BRIEF SUMMARY OF THE INVENTION

Specifically, an object of the present invention is to propose a combustion engine making it possible to avoid the above-mentioned limitations. Specifically, this combustion engine possesses means for substantially increasing its reliability while avoiding transmitting axial forces via the transmission assembly.

The invention thus relates to a combustion engine comprising:

at least one crankshaft rotatable about a first axis of rotation;

at least one output shaft for engine torque, such an output shaft being rotatable about a second axis of rotation that is parallel to the first axis of rotation and distinct from the first axis of rotation; and at least one transmission assembly rotatable about the first axis of rotation and being driven in rotation by the crankshaft to transmit the engine torque to the output shaft.

This combustion engine is remarkable in that it includes means, referred to as "limitation means", for limiting axial movement of the transmission assembly relative to the crankshaft along the first axis of rotation, the "limitation means" comprising:

an abutment part is inserted into an internal housing in an end of the crankshaft, the abutment part being held axially between two facing walls of the internal housing with limited axial clearance J in translation along the first axis of rotation, the abutment part bearing against a first end of said transmission assembly;

a stopper bearing against a second end of the transmission assembly; and clamping means for exerting an axial clamping force between the stopper, the transmission assembly, and the abutment part, such a clamping force being directed in parallel with the first axis of rotation.

In other words, the "limitation means" make it possible to block movement in relative translation along the first axis of rotation between the transmission assembly and the crankshaft. Only a minimum amount of axial clearance can remain, in particular to make it possible to assemble together the moving parts in spite of small variations in dimensions or of differential expansion with increasing temperature of the engine in operation.

Such blocking in translation is obtained by positioning the abutment inside a housing formed in the crankshaft and holding it stationary therein. Specifically, such an abutment part is held captive in the housing by being jammed between two facing walls that are advantageously arranged parallel to each other and perpendicularly to the first axis of rotation.

The two facing walls of the housing serving to block the abutment part may be formed directly by the crankshaft or by at least one auxiliary part such as a resilient ring held axially in position in a groove formed in the crankshaft.

The stopper and the clamping means serve to hold the transmission assembly with the abutment part against movement in translation inside the housing of the crankshaft.

Advantageously, the transmission assembly may include an intermediate sleeve and a first transmission member that are secured to each other, the first transmission member driving rotation of a second transmission member secured with the output shaft.

In other words, the transmission assembly includes at least two parts that are secured to each other for transmitting the engine torque from the crankshaft to the second transmission member. The parts may be secured together in such a manner as to include means for at least eliminating a degree of freedom to move in rotation about the first axis of rotation, such as interfitting male and female fluting. Male fluting can then be arranged on one end of an intermediate sleeve facing the first transmission member. The male fluting then co-operates with female fluting arranged in the first transmission member.

Likewise, the connection between the second transmission member and the output shaft may include means for at least eliminating a degree of freedom to move in rotation about the second axis of rotation such as interfitting male and female fluting.

These first and second transmission members are advantageously formed by transmission gears, e.g. having straight teeth, meshing directly with each other, however they are not limited to this particular embodiment. Specifically, it is also possible to envisage transmission by means of a chain and sprocket wheels, likewise enabling engine torque to be transmitted between the transmission assembly and the output shaft.

In practice, the end of the crankshaft may include female fluting co-operating with male fluting of complementary shape formed on the transmission assembly, the abutment part also including male fluting of complementary shape enabling it to slide in the female fluting of the crankshaft and enabling the abutment part to be inserted into the internal housing, the internal housing being arranged downstream in the insertion direction from the female fluting of the end of the crankshaft, the internal housing having the shape of a body of revolution defined by the two facing walls, this shape enabling the abutment part to turn about the first axis of rotation inside the internal housing, one of the facing walls of the internal housing consisting in a set of end faces of the female fluting.

In this way, the fluting connection between the crankshaft and the transmission assembly serves to eliminate a degree of freedom to move in rotation about the first axis of rotation. This connection also makes it possible to insert the abutment part in the housing of the crankshaft and then to block it axially by turning the abutment part inside the housing about the first axis of rotation. For this purpose, it is then possible to cause the abutment part to turn through an angle equal to half the pitch of the fluting so that the male fluting of the abutment part faces the end faces of the female fluting of the crankshaft.

The facing walls of the housing, and the housing as such, may for example be made by machining an internal chamber at the ends of the female fluting in the end of the crankshaft.

In addition, the abutment part may include at least one index means emerging axially towards the first end of the transmission assembly, the index means co-operating with at least one other index means of complementary shape formed in the first end of the transmission assembly.

Thus, once the transmission assembly is in place in the crankshaft against the abutment part, the two index means co-operate with each other, thereby preventing free turning of the abutment part inside the housing. Such index means may in particular be in the form of lugs or pegs emerging axially from the abutment part or from the first end of the transmission assembly and co-operating with bores of complementary shape formed in the first end of the transmission assembly or in the abutment part.

Furthermore, the clamping means may comprise a screw with a thread arranged at a free end of the screw, the screw being arranged axially along the first axis of rotation.

Such a screw then passes both through the stopper and through the abutment part and serves to press these tow parts against the transmission assembly. Such a screw can then co-operate with an auxiliary nut or with tapping complementary to the thread arranged directly in the abutment part.

Thus, the abutment part may include tapping co-operating with the thread of the screw, and the stopper may include a bore through which the screw passes freely.

Under such circumstances, the screw is then inserted first through the bore in the stopper, passes inside a hollow portion of the transmission assembly, and then the screw thread co-operates with the complementary tapping formed in the abutment part.

Advantageously, the transmission assembly rotatable about the first axis of rotation may be guided in rotation relative to an engine casing by means of guide elements selected from the group comprising: ball bearings, roller bearings, needle bearings, and smooth bearings.

Specifically, such guide elements serve to hold the transmission assembly radially on the first axis of rotation and to guarantee free rotation of the transmission assembly relative to the engine casing with a minimum amount of friction.

In practice, the combustion engine may include two rows of at least one cylinder each, each cylinder receiving a piston slidable along a travel axis, the travel axes of one row being angularly offset at an angle $\alpha$ relative to the travel axes of the other row, the second axis of rotation being arranged within an angular sector of angle $\alpha$ between the two rows.

In addition, the angle $\alpha$ is less than or equal to 180°, and the second axis of rotation is located inside the angular sector of angle $\alpha$. Advantageously, the second axis of rotation may be centered between the two rows, each of at least one cylinder, and may thus be arranged on the bisector of the angle $\alpha$.

The present invention also provides an aircraft including propulsion and/or lift means for providing such an aircraft with propulsion and/or lift.

The aircraft is remarkable in that the propulsion and/or lift means are driven by a combustion engine as described above.

Such a combustion engine can thus form part of a power plant of the aircraft serving to drive the propulsion and/or lift means.

Finally, the invention also provides a method of fabricating the above-specified combustion engine.

In addition, such a fabrication method is remarkable in that it includes a limitation step consisting in limiting axial clearance allowing the transmission assembly to move relative to the crankshaft along the axis of rotation, the limitation step comprising the following successive substeps:

inserting an abutment part in an internal housing in one end of the crankshaft;

positioning the transmission assembly in the end of the crankshaft in order to enable the transmission assembly to be driven in rotation;

holding the abutment part axially between two facing walls of the internal housing with limited axial clearance J in translation along the first axis of rotation, the abutment part bearing against a first end of the transmission assembly;

positioning a stopper on a second end of the transmission assembly; and exerting an axial clamping force between the stopper, the transmission assembly, and the abutment part, the clamping force being directed in parallel with the first axis of rotation.

In other words, the limitation step is obtained by performing a plurality of substeps in succession. These substeps serve to prevent the transmission assembly moving axially relative to the crankshaft, ignoring clearance. Thus, the crankshaft drives rotation of the transmission assembly with minimum axial clearance.

Advantageously, the substep consisting in inserting an abutment part in an internal housing in an end of the crankshaft may be performed by sliding the abutment part in an insertion direction along the first axis of rotation into the inside of the end of the crankshaft, such an end of the crankshaft including female fluting suitable for enabling sliding of the abutment part having male fluting of complementary shape, the internal housing being arranged in the end of the crankshaft downstream in the insertion direction from the female fluting of the crankshaft.

In other words, while moving in the end of the crankshaft that includes female fluting, the abutment part with male fluting can move relative to the crankshaft in sliding only. Once it has been inserted in the internal housing, the abutment part can then turn freely about the first axis of rotation.

In practice, the substep consisting in positioning the transmission assembly in the end of the crankshaft may be performed by causing the transmission assembly to slide inside the end of the crankshaft, such an end of the crankshaft including female fluting engaging male fluting of complementary shapes formed on the transmission assembly.

Under such circumstances, the fluting serves both to transmit engine torque from the crankshaft to the transmission assembly and also to index the crankshaft angularly relative to the transmission assembly. Specifically, once the transmission assembly is in position in the end of the crankshaft, such a transmission assembly can no longer turn relative to the crankshaft about the first axis of rotation, ignoring the clearance of the fluting connection.

In addition, the substep consisting in holding the abutment part axially between two facing walls of the internal housing may be obtained:

by causing the abutment part to turn about the first axis of rotation in the internal housing, one of the facing walls of the internal housing consisting in a set of end faces of the female fluting of the crankshaft; and by indexing the abutment part with the first end of the transmission assembly positioned in the end of the crankshaft that includes female fluting.

Thus, once the abutment part is indexed with the first end of the transmission assembly, it can no longer turn freely inside the internal housing. Specifically, and as mentioned above, the transmission assembly co-operates with the end of the crankshaft via complementary male/female fluting that eliminates the degree of freedom between these two pieces to move in rotation about the first axis of rotation.

Furthermore and by way of example, the abutment part may be turned through half the pitch of the fluting so as to limit movement in translation along the first axis of rotation for the abutment part relative to the crankshaft.

Furthermore, the substep consisting in exerting an axial clamping force between the stopper and the transmission assembly and the abutment part may be performed by tightening a screw having a head bearing against an outside face of the stopper, the stopper including a bore through which the screw passes freely, the screw having a thread arranged at a free end of the screw, such a thread co-operating with tapping formed in the abutment part.

In other words, the clamping force is exerted by screwing a screw into the tapping of the abutment part. Such a clamping force is thus proportional to the clamping torque of the screw, which is advantageously determined by means of a torque wrench so as to guarantee clamping with a predetermined clamping force.

BRIEF DESCRIPTION OF THE DRAWINGS

The invention and its advantages appear in greater detail in the context of the following description of embodiments given by way of illustration with reference to the accompanying figures, in which.

DETAILED DESCRIPTION OF THE INVENTION

Elements that are present in more than one of the figures are given the same references in each of them.

As mentioned above, the invention thus relates to a combustion engine serving to reduce and/or absorb at least in part the jolts at the output of the crankshaft, e.g. via a decoupling shaft, or more generally via a shaft enabling power to be taken from the engine other than from the crankshaft, which decoupling shaft may for example be parallel to the crankshaft.

Figure 1:
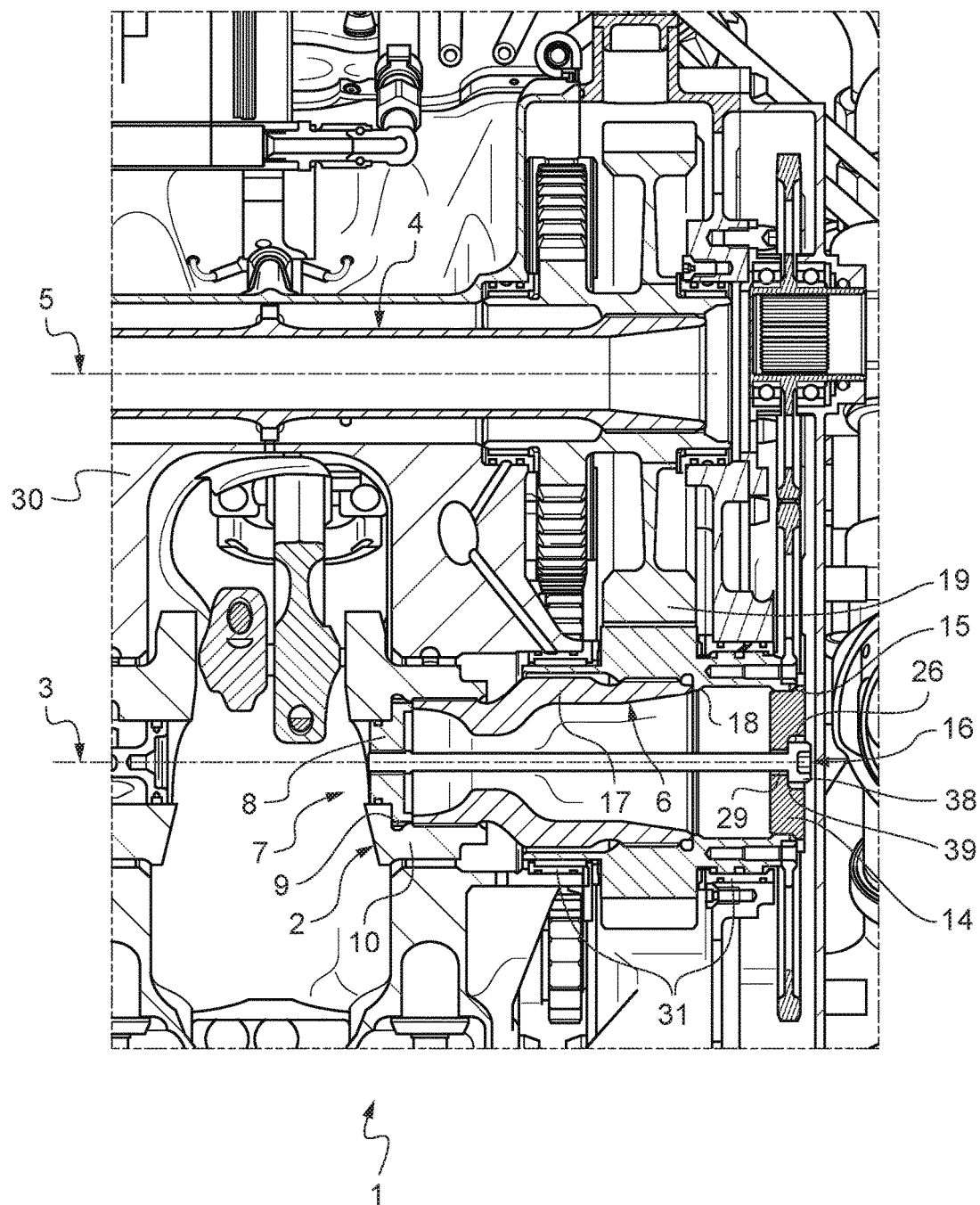
FIG. 1 is a fragmentary longitudinal section view of a combustion engine in accordance with the invention.

Thus, as shown in FIG. 1, the combustion engine 1 has a crankshaft 2 rotating about a first axis of rotation 3. In addition, a transmission assembly 6 is arranged at one end 10 of the crankshaft 2 in order to transmit the engine torque from the crankshaft 2 to an output shaft 4 rotating about a second axis of rotation 5.

As shown, the transmission assembly 6 may include an intermediate sleeve 17 and a first transmission member 18 that are constrained to rotate together by means of male/female fluting. The first transmission member 18 may then drive rotation of a second transmission member 19 constrained to rotate with the output shaft 4, likewise by means of male/female fluting.

Such a transmission assembly 6 is then guided in rotation relative to the engine casing 30 by means of guide elements 31, such as needle bearings, in particular.

Furthermore, such a combustion engine 1 includes "limitation means" 7 serving to limit the axial movement of the transmission assembly 6 along the first axis of rotation 3 limited to the crankshaft 2. Such "limitation means" 7 also include an abutment part 8 positioned inside an internal housing 9 at the end of the crankshaft.

Figure 2:
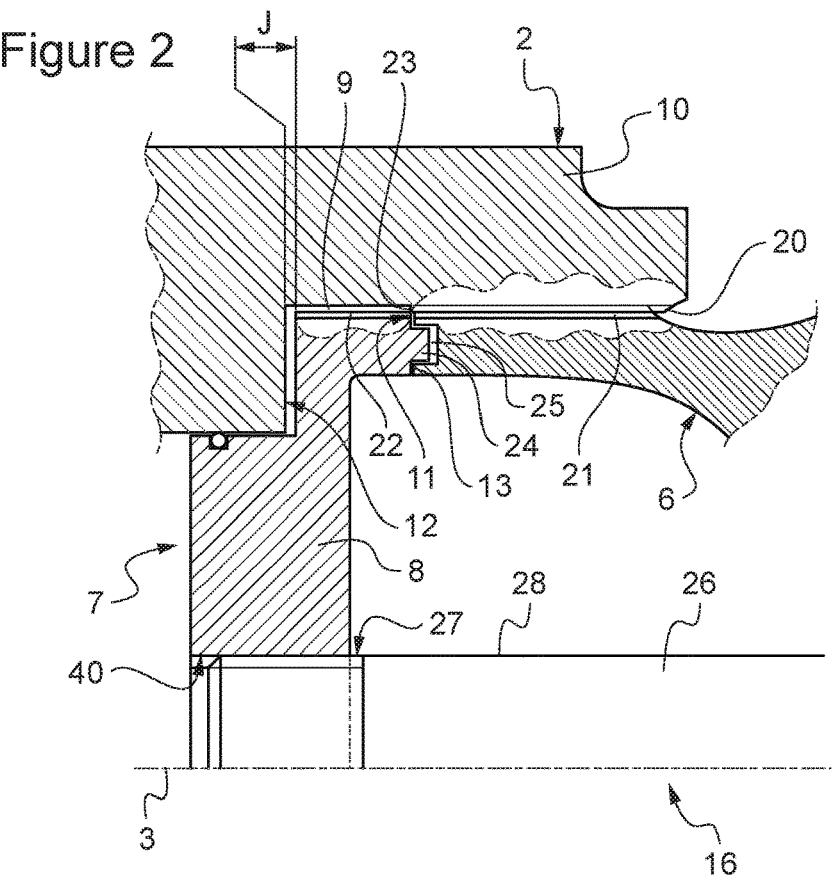
FIG. 2 is an enlarged longitudinal section view showing "limitation means" in accordance with the invention.

As shown in FIG. 2, such an abutment part 8 is then held axially in position on the first axis of rotation 3 by two facing walls 11, 12 of the internal housing 9. Only limited clearance J in translation allows the abutment part 8 to revolve inside the internal housing 9.

To do this, the abutment part 8 has male fluting 22 co-operating in complementary manner with female fluting 20 formed in the end 10 of the crankshaft 2. The abutment part 8 can then be inserted into the internal housing 9 by sliding it along the female fluting 20. Once inside the internal housing 9, the abutment part 8 is caused to turn about the first axis of rotation 3 through at least one half-pitch so that its male fluting 22 is angularly offset relative to the female fluting 20 of the end 10. Under such circumstances, the wall 11 of the internal housing 9 is then formed by a set of end faces 23 of the female fluting 20 in the end 10.

Likewise, the transmission assembly 6 has male fluting 21 co-operating in complementary manner with the female fluting 20 formed in the end 10 of the crankshaft 2. Once inserted into the end 10, the transmission assembly 6 can bear against the abutment part 8 at a first end 13 of the transmission assembly 6.

Furthermore, the abutment part 8 has at least one index means 24 co-operating in complementary manner with at least one other index means 25 formed in the transmission assembly 6. Such an arrangement then makes it possible to eliminate the degree of freedom of the abutment part 8 to move in rotation relative to the transmission assembly 6, and thus relative to the crankshaft 2, ignoring the clearance in the connection via male fluting 21 and female fluting 20.

Furthermore, the "limitation means" 7 also include a stopper 14 bearing against a second end 15 of the transmission assembly 6, and clamping means 16 serving to eliminate a degree of freedom to move in translation between the abutment part 8, the transmission assembly 6, and the stopper 14.

Such clamping means 16 can then comprise a screw 26 passing through the stopper 14 via a bore 29. Such a screw 26 has a head 38 that bears against an outside face 39 of the stopper 14 and a thread 27 at a free end 28. Such a thread 27 co-operates in helical connection with tapping 40 formed in the abutment part 8. Once the screw 26 is in place, a clamping torque is then applied to the head 38, which torque is selected to avoid any accidental loosening.

Figure 3:
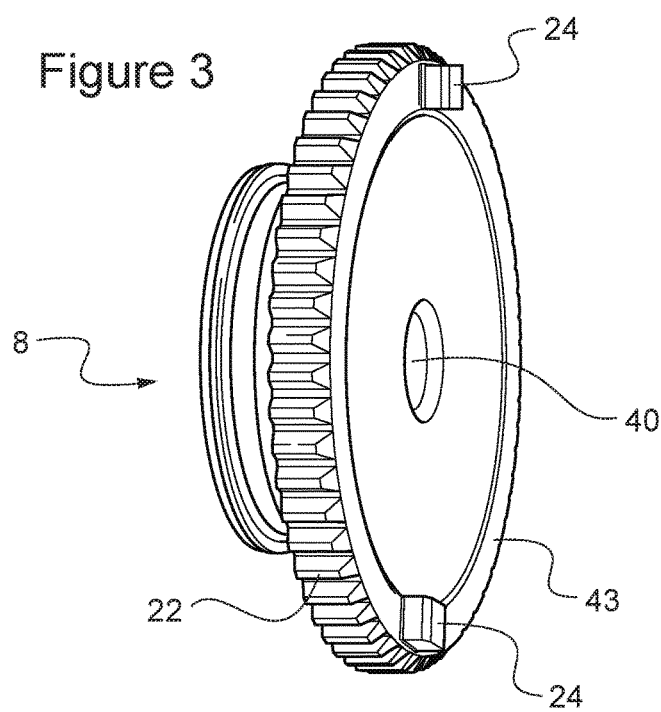
FIG. 3 is a perspective view of an abutment part in accordance with the invention.

As shown in FIG. 3, the index means 24 of the abutment part 8 may consist in prismatic lugs emerging from a substantially plane face 43. There may be two such lugs arranged diametrically opposite each other.

Figure 4:
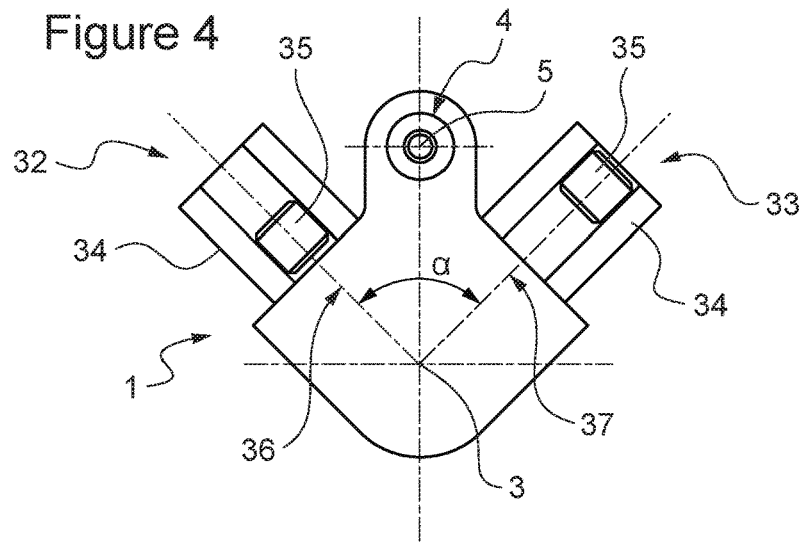
FIG. 4 is a schematic diagram in cross-section showing a combustion engine in accordance with the invention.

As shown in FIG. 4, the combustion engine 1 may have two rows 32, 33 of cylinders 34. Furthermore, each row 32, 33 having at least one cylinder is defined by a travel axis 36, 37 of at least one piston 35.

Under such circumstances, the two travel axes 36, 37 are angularly offset relative to each other by an angle α about the first axis of rotation 3, e.g. giving the combustion engine a V-shaped architecture. Naturally, in other embodiments of the invention that are not shown, the travel axes of the piston may also be offset angularly relative to one another by an angle α without intersecting the first axis of rotation 3.

Under such circumstances, the output shaft 4 is arranged inside the angular sector a, and advantageously the second axis of rotation 5 is positioned on the bisector of the angle □ and parallel to the first axis of rotation 3.

Figure 5:
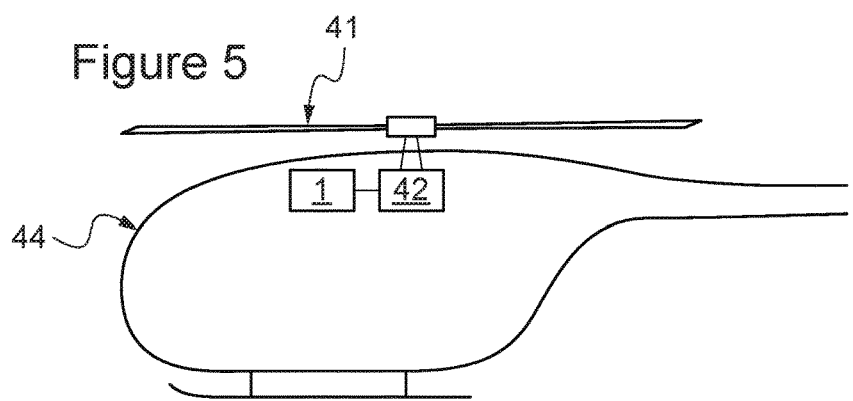
FIG. 5 shows an aircraft fitted with a combustion engine in accordance with the invention.

As shown in FIG. 5, the invention also relates to an aircraft 44 fitted with a combustion engine 1 as described above. The combustion engine 1 then drives rotation of propulsion and/or lift means 41 enabling the aircraft 44 to fly.

As shown, such an aircraft 44 may for example be in the form of a rotorcraft. Under such circumstances, the combustion engine 1 may be coupled to a main power transmission gearbox 42 for driving the propulsion and/or lift means 41 formed by a main rotor.

Figure 6:
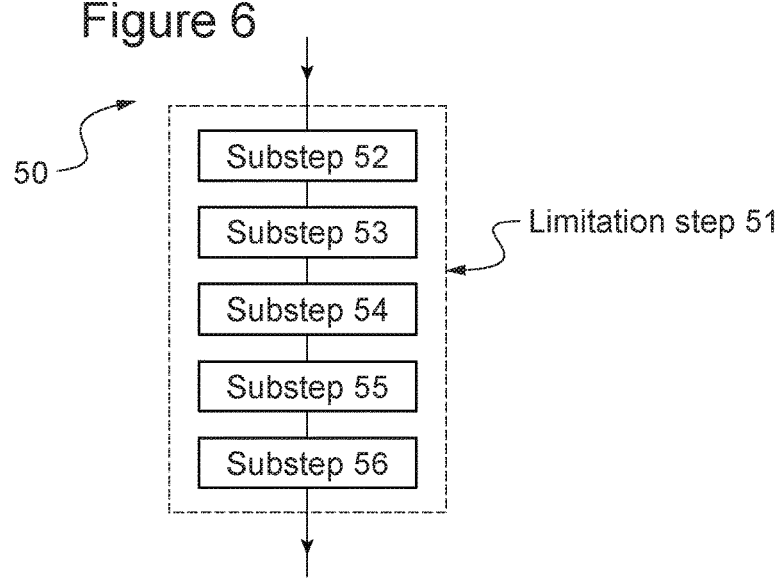
FIG. 6 is a flow chart showing certain substeps of the method of fabricating a combustion engine in accordance with the invention.

Finally, as shown in FIG. 6, the invention also relates to a method 50 of fabricating a combustion engine 1. In addition, such a fabrication method 50 includes a limitation step 51 for limiting the axial movement of the transmission assembly 6 relative to the crankshaft 2.

Furthermore, this limitation step 51 may be subdivided into a plurality of substeps 52, 53, 54, 55, and 56 that are performed successively one after another.

Thus, the limitation step 51 comprises a first substep 52 consisting in inserting the abutment part 8 in the internal housing 9 of the crankshaft 2. Such insertion is advantageously performed by causing the male fluting 22 of the abutment part 8 to co-operate with the female fluting 20 in the end 10. The abutment part 8 can then slide axially along the first axis of rotation 3 relative to the crankshaft 2 before penetrating into the internal housing 9 of the crankshaft 2.

Furthermore, the limitation step 51 comprises a substep 53 consisting in positioning the transmission assembly 6 in the end 10 of the crankshaft 2 in order to drive rotation of the transmission assembly 6. Like the abutment part 8, the transmission assembly 6 may have male fluting 21 co-operating with the female fluting 20 of the end 10.

The limitation step 51 then comprises a substep 54 consisting in holding the abutment part 8 axially in the internal housing 9 between two facing walls 11, 12, with limited axial clearance J. To do this, the abutment part 8 is caused to turn about the first pivot axis 3 and the abutment part 8 is indexed with the first end 13 of the transmission assembly 6.

The limitation step 51 then comprises a substep 55 consisting in positioning the stopper 14 on the second end 15 of the transmission assembly 6.

Finally, the limitation step 51 comprises a substep 56 of exerting an axial clamping force on the stopper 14, the transmission assembly 6, and the abutment part 8. Such a substep 56 is then performed by exerting clamping torque on the screw 26 passing through the stopper 14 and the transmission assembly 6, and having a thread 27 that co-operates with tapping 40 formed in the abutment part 8.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A combustion engine comprising: at least one crankshaft rotatable about a first axis of rotation; at least one output shaft for engine torque, the output shaft being rotatable about a second axis of rotation distinct from the first axis of rotation; and at least one transmission assembly rotatable about the first axis of rotation and being driven in rotation by the crankshaft to transmit the engine torque to the output shaft; wherein the combustion engine includes means, referred to as "limitation means", for limiting axial movement of the transmission assembly relative to the crankshaft along the first axis of rotation, the "limitation means" comprising: an abutment part inserted into an internal housing in an end of the crankshaft, the abutment part being held axially between two facing walls of the internal housing with limited axial clearance (J) in translation along the first axis of rotation, the abutment part bearing against a first end of the transmission assembly; a stopper bearing against a second end of the transmission assembly; and clamping means for exerting an axial clamping force between the stopper, the transmission assembly, and the abutment part, the clamping force being directed in parallel with the first axis of rotation.

2. The combustion engine according to claim 1, wherein the transmission assembly includes an intermediate sleeve and a first transmission member that are secured to each other, the first transmission member driving rotation of a second transmission member secured with the output shaft.

3. The combustion engine according to claim 1, wherein the end of the crankshaft includes female fluting co-operating with male fluting of complementary shape formed on the transmission assembly, the abutment part also including male fluting of complementary shape enabling the abutment part to slide in the female fluting of the crankshaft and enabling the abutment part to be inserted into the internal housing, the internal housing being arranged downstream in an insertion direction from the female fluting of the end of the crankshaft, the internal housing having a shape of a body of revolution defined by the two facing walls, the shape of a body of revolution enabling the abutment part to turn about the first axis of rotation inside the internal housing, one of the facing walls of the internal housing consisting in a set of end faces of the female fluting of the crankshaft.

4. The combustion engine according to claim 1, wherein the abutment part includes at least one index means emerging axially towards the first end of the transmission assembly, the at least one index means co-operating with at least one other index means of complementary shape formed in the first end of the transmission assembly.

5. The combustion engine according to claim 1, wherein the clamping means comprise a screw with a thread arranged at a free end of the screw, the screw being arranged axially along the first axis of rotation.

6. The combustion engine according to claim 5, wherein the abutment part includes tapping co-operating with the thread of the screw, and the stopper includes a bore through which the screw passes freely.

7. The combustion engine according to claim 1, wherein the transmission assembly rotatable about the first axis of rotation is guided in rotation relative to an engine casing by means of guide elements selected from the group comprising: ball bearings, roller bearings, needle bearings, and smooth bearings.

8. The combustion engine according to claim 1, wherein the combustion engine includes two rows of at least one cylinder each, each cylinder receiving a piston slidable along a travel axis, the travel axes of one row being angularly offset at an angle α relative to the travel axes of the other row, the second axis of rotation being arranged within an angular sector of angle α between the two rows.

9. An aircraft including propulsion and/or lift means for providing the aircraft with propulsion and/or lift, wherein the propulsion and/or lift means are driven by the combustion engine according to claim 1.

10. A fabrication method for fabricating the combustion engine according to claim 1, wherein the fabrication method includes a limitation step consisting in limiting axial clearance allowing the transmission assembly to move relative to the crankshaft along the axis of rotation, the limitation step comprising the following successive substeps:

inserting an abutment part in an internal housing in one end of the crankshaft;

positioning the transmission assembly in the end of the crankshaft in order to enable the transmission assembly to be driven in rotation;

holding the abutment part axially between two facing walls of the internal housing with limited axial clearance (J) in translation along the first axis of rotation, the abutment part bearing against a first end of the transmission assembly;

positioning a stopper on a second end of the transmission assembly; and exerting an axial clamping force between the stopper, the transmission assembly, and the abutment part, the clamping force being directed in parallel with the first axis of rotation.

11. The method according to claim 10 for fabricating a combustion engine, wherein the substep consisting in inserting an abutment part in an internal housing in an end of the crankshaft is performed by sliding the abutment part in an insertion direction along the first axis of rotation into the inside of the end of the crankshaft, the end of the crankshaft including female fluting suitable for enabling sliding of the abutment part having male fluting of complementary shape, the internal housing being arranged in the end of the crankshaft downstream in the insertion direction from the female fluting of the crankshaft.

12. The method according to claim 10 for fabricating a combustion engine, wherein the substep consisting in positioning the transmission assembly in the end of the crankshaft is performed by causing the transmission assembly to slide inside the end of the crankshaft, the end of the crankshaft including female fluting engaging male fluting of complementary shapes formed on the transmission assembly.

13. The method according to claim 11 for fabricating a combustion engine, wherein the substep consisting in positioning the transmission assembly in the end of the crankshaft is performed by causing the transmission assembly to slide inside the end of the crankshaft, the end of the crankshaft including female fluting engaging male fluting of complementary shapes formed on the transmission assembly and for fabricating the combustion engine, and wherein the substep consisting in holding the abutment part axially between two facing walls of the internal housing is obtained:

by causing the abutment part to turn about the first axis of rotation in the internal housing, one of the facing walls of the internal housing consisting in a set of end faces of the female fluting of the crankshaft; and by indexing the abutment part with the first end of the transmission assembly positioned in the end of the crankshaft that includes female fluting.

14. The method according to claim 10 for fabricating a combustion engine, wherein the substep consisting in exerting an axial clamping force between the stopper and the transmission assembly and the abutment part is performed by tightening a screw having a head bearing against an outside face of the stopper, the stopper including a bore through which the screw passes freely, the screw having a thread arranged at a free end of the screw, the thread co-operating with tapping formed in the abutment part.

* * * * *